July 9, 1929. H. L. JOHNSON 1,720,477
TRUNK RACK
Filed June 9, 1928  2 Sheets-Sheet 1
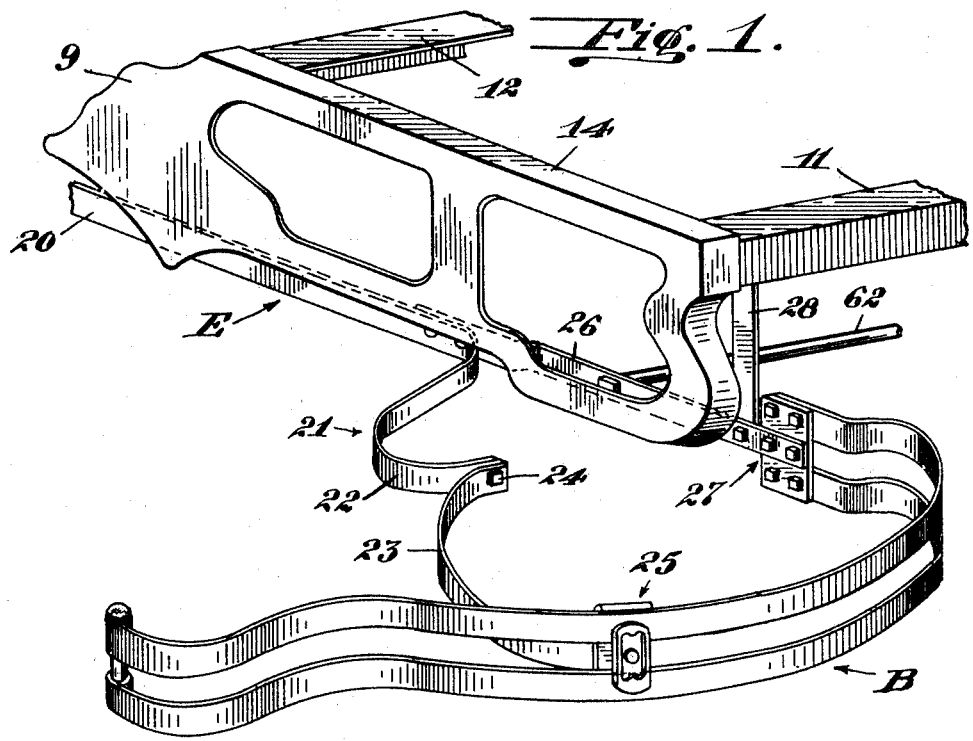
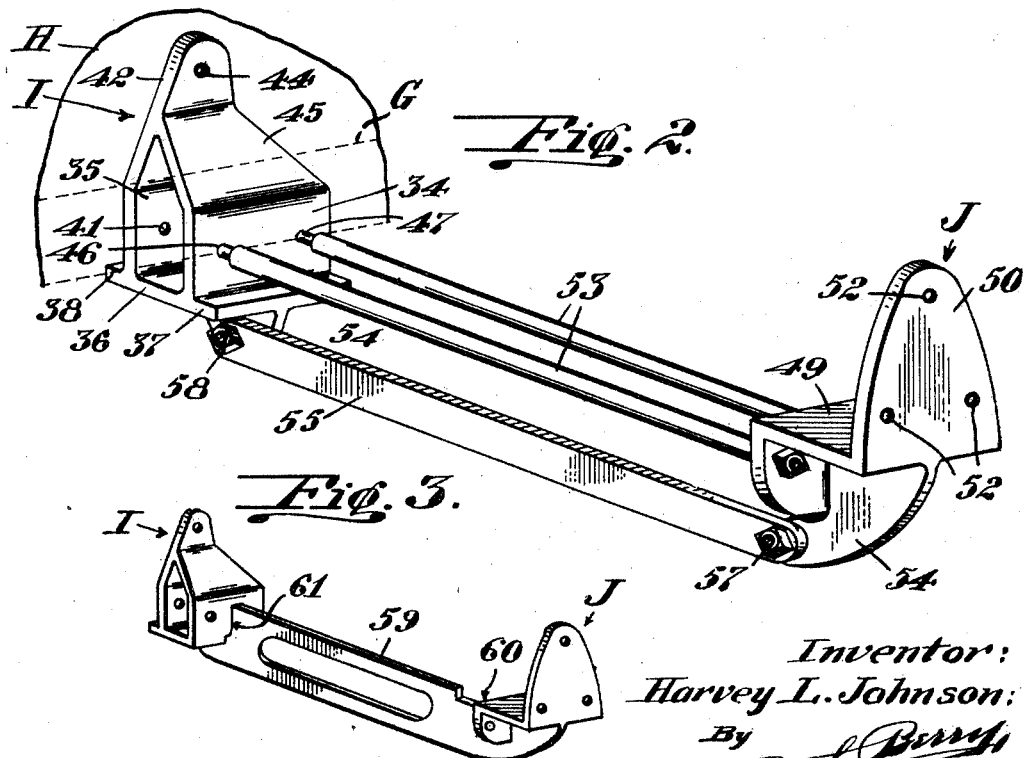
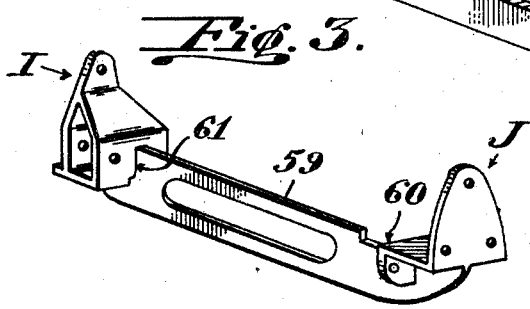
Inventor:
Harvey L. Johnson,
By R. S. Berry
Atty.

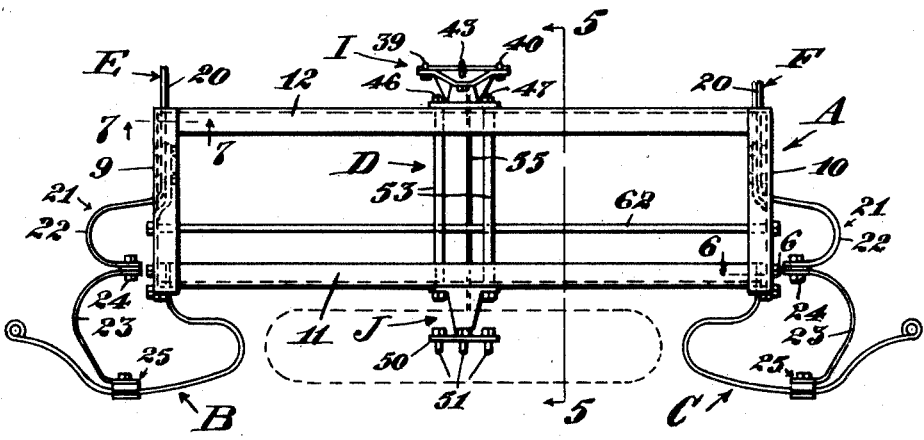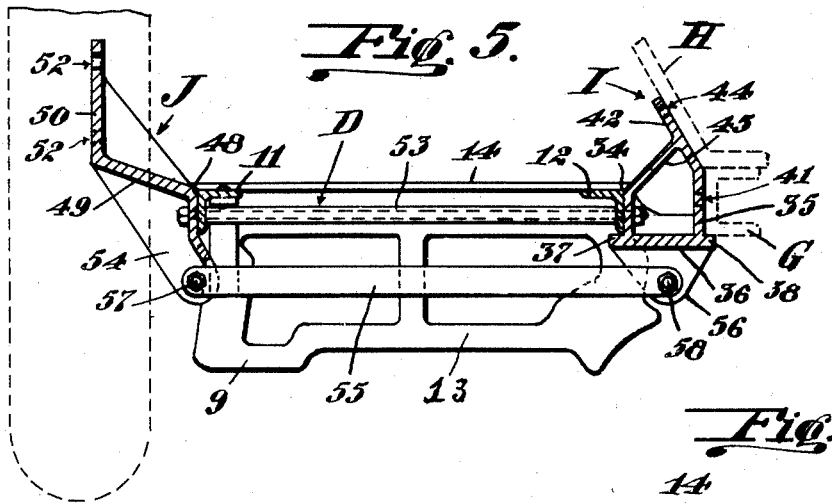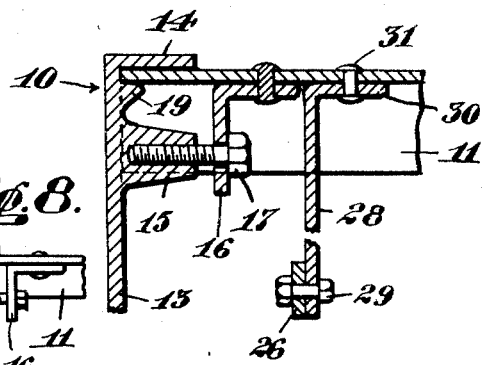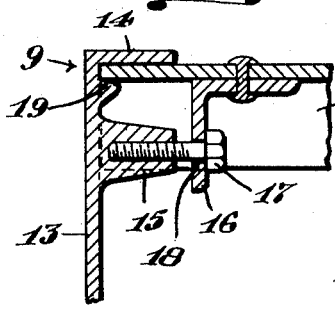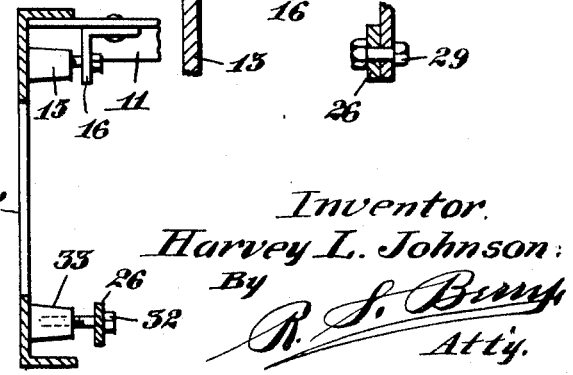

Patented July 9, 1929.

1,720,477

UNITED STATES PATENT OFFICE.

HARVEY L. JOHNSON, OF LOS ANGELES, CALIFORNIA, ASSIGNOR TO EARL E. LAMBERT, OF LOS ANGELES, CALIFORNIA.

TRUNK RACK.

Application filed June 9, 1928. Serial No. 284,053.

This invention relates to automobile accessories and more particularly pertains to a trunk rack for attachment to the rear end of a motor vehicle.

An object of the invention is to provide a trunk rack which is especially applicable for use on automobiles having rearwardly extending bumper bar carrying brackets projecting from the rear ends of the side frames of the vehicle chassis, such as in the Ford automobile of the 1928 model; the present invention contemplating the employment of such brackets as a means of attachment and support to the end portions of my trunk rack as well as affording a bumper bar support.

Another object is to provide a trunk rack attachment for automobiles which, while serving as a support for a spare tire or wheel, and which may also be employed as a mounting for bumpers.

Another object is to provide a construction in a trunk rack whereby the rack, while being supported at its ends on brackets extended from the vehicle frame, will also be securely affixed to the vehicle body and to the rear end frame member of the chassis in such manner as to afford a strong and substantial carrier for loads imposed thereon.

Another object is to provide a trunk rack attachment for automobiles embodying an intermediate supporting bracket which is so formed as to also serve as a support for a spare tire or wheel.

Another object is to provide a trunk rack of the character described embodying a frame structure and a means of attachment to the rear end of an automobile which consists of few parts that may be readily constructed and assembled, which may be easily applied, and which is strong and durable.

With the foregoing objects in view, together with such other objects and advantages as may subsequently appear, the invention resides in the parts and features, and in the combination, construction and arrangement of parts hereinafter described and claimed and illustrated by way of example in the accompanying drawings, in which:

Fig. 1 is a fragmentary perspective view of one end of the trunk rack showing the manner of mounting same and depicting the bumper attached;

Fig. 2 is a perspective view of the intermediate trunk rack supporting member with the rack frame removed;

Fig. 3 is a perspective view showing a modification of the intermediate supporting member;

Fig. 4 is a top plan view of the trunk rack with bumpers attached and indicating in dotted lines the position of the spare tire or wheel as carried thereon;

Fig. 5 is an enlarged detail in vertical section and elevation as seen on the line 5—5 of Fig. 4 with the bumper detached;

Fig. 6 is an enlarged detail in section as seen on the line 6—6 of Fig. 4, showing a manner of connecting the forward end portions of the trunk rack to the bumper supporting brackets;

Fig. 7 is a detail in section taken on the line 7—7 of Fig. 4, showing the manner of assembling the side and end members of the trunk rack;

Fig. 8 is a detail showing a modified form of the connection between the end portions of the trunk rack and the bumper supporting bracket.

Referring to the drawings more specifically, A indicates generally the trunk rack, B and C the bumpers, and D the intermediate support. The trunk rack A embodies a pair of end plates 9 and 10, and front and rear rails 11 and 12; the end plates and rails being connected together to form a rectangular frame. Each of the end plates comprises a vertical wall portion 13 which may be of any suitable outline but is preferably formed with a straight upper edge from which projects an inwardly extending flange 14; the flange being continued down the forward end of the plate to afford a finish.

The rails 11 and 12 consist of angle irons which are arranged with their ends abutting against the inner faces of the end plates and with one of the webs thereof extending horizontally adjacent the under side of the flange 14, as shown in Figs. 6 and 7, and with the other webs thereof extending vertically and facing outwardly in opposed relation, as shown in Fig. 5. The upper faces of the rails 11 and 12 extend on a common plane and afford a level supporting surface for a trunk, not shown, which latter may be of any suitable construction.

As a means of affording a secure connection between the end plates and the rails in a manner to avoid projections on the outer faces of the end plates, the latter are formed adjacent their ends with inwardly projecting bosses 15 and the rails are provided with down-turned flanges 16 arranged to project opposite the lugs 15 in spaced relation thereto, with which flanges are engaged bolts 17 passing through openings 18 in the flange 16 and screwed into engagement with the lugs 15 whereby the end plates are drawn tightly against the ends of the rails. As a means for relieving the bolts of loads imposed on the rails, the ends of the latter are seated on shoulder 19 projecting inwardly from the end plates at points above the lugs 15 and which shoulders extend beneath the upper or horizontally extending webs of the rails. The flanges 16 are here shown as comprising angle irons which are riveted to the rails.

The trunk rack frame A is designed to be supported at its ends on a pair of brackets E and F which are ordinarily connected to and extend rearwardly from the side frame members of an automobile chassis; the brackets E and F here shown being illustrative of those employed in the 1928 model of the Ford automobile as a bumper support and accordingly constitute part of the equipment of such vehicle. Each of the brackets E and F embodies an inner end portion 20 which may be affixed to the vehicle frame in any desired, or the conventional manner, not necessary to be here shown, and also includes an outer end portion 21 which is bent outwardly and thence inwardly to form inwardly opening U-shaped spring bends 22, the ends of which, in the standard equipment, are ordinarily connected directly to a bumper but in carrying out the present invention in order to project the bumper in greater spaced relation to the rear end of the vehicle so as to extend beyond the trunk rack when applied thereto, a bowed extension 23 is affixed to the outer extremity of the U-bend of each bracket by a bolt 24 as shown in Fig. 1 and has its outer end affixed to the bumper intermediate the ends thereof in the usual manner as indicated at 25. A second extension bar 26 is affixed to each bracket and is arranged to project opposite and on a plane with the U-bend end portion thereof; the outer end of the extension 26 being affixed to the inner end portion of the bumper in the conventional manner as indicated at 27. The extension 26 affords a support for the outer corners or ends of the trunk rack which may be affixed thereto as shown in Figs. 6 and 8, whereby the end portions of the rack will be carried by the brackets E and F through the medium of the extension 26.

In the construction shown in Fig. 6, a hanger 28 is mounted adjacent each end of the outer rail 11 and projecting downwardly therefrom is affixed at its lower extremity to the extension 26 by a bolt 29 so that the outer corners of the trunk rack will be supported on the vehicle brackets through the medium of the hanger 28 and extension 26. The hanger 28 is here shown as formed with end flange 30 which is secured to the top web of the rail 11 as by rivets 31. In the construction shown in Fig. 8, the end plate 10' of the trunk rack is affixed directly to the extension 26 by a bolt 32 which passes through the extension and is screwed into engagement with a boss 33 formed on the inner face of the end plate; this arrangement being employed where the hanger 28 may be dispensed with. In this manner, the vehicle brackets E and F afford a support both for the bumpers B and C and also for the end portions of the trunk rack.

The intermediate support D is designed to be affixed to the end frame member G and to the rear end of the body H of the automobile and to project therefrom in such manner as to afford a support for the rails 11 and 12 midway of their ends and at the same time provide a means for supporting a spare tire or wheel carrier. This intermediate support embodies an inner end member I and an outer end member J, which members are connected together as will be hereinafter explained, and are positioned against the outer faces of the rails 11 and 12.

The member I embodies a pair of spaced parallel upstanding walls 34 and 35, the lower ends of which are affixed to a horizontal plate 36 which projects beyond the opposite faces of the walls 34 and 35 to provide flanges 37 and 38. The wall 35 is designed to abut against the outer face of the end frame member G of the vehicle chassis with the flange 38 projecting therebeneath and is affixed to the frame member G by bolts 39 and 40 shown in Fig. 4, which pass through openings 41 formed in wall 35; the upper portion of the wall 35 having formed in continuation therewith an outwardly inclined flange 42 which seats against the outer face of the vehicle body H and is affixed thereto by a bolt 43 which passes through an opening 44 in the flange 42. The flange 42 is connected to the upper margin of the wall 34 by a diagonal web 45 which affords a tie between the upper margin of the wall 34 and vehicle body. The rail 12 is arranged with its outer face abutting against the wall 34 and with its lower margin seating on the flange 37 and is secured thereto by bolts 46 and 47.

The rear end member J embodies a wall portion 48 which seats against the outer face of the rail 11 and is secured thereto by bolts, and also includes an outwardly extending wall 49 terminating in an upstanding wall 50 which latter affords a support for a spare wheel or tire carrier of any suitable construction, and which carrier is affixed to the wall 50 by bolts 51, engaging holes 52 in the wall 50. The upstanding wall 50 projects on a plane spaced outwardly from the outer rail 11 a distance sufficient to space a tire or wheel thereon from the outer face of a trunk supported on the trunk rack.

The connection between the members I and J, as shown in Figs. 2, 4 and 5, embodies a pair of tie-rods which comprise the bolts 46 and 47 which are passed through the wall 34 of the inner end member I, through the rail 12, through rail 11 and through the wall 48 of the outer end member; each bolt being provided with the usual head and nut whereby it is held in place. A spacing sleeve 53 encompasses each bolt and extends between the rails 11 and 12.

As a means for directing thrusts imparted to the outer end member J to the vehicle frame member G by reason of loads imposed on the member J, the latter is formed with a downwardly projecting ear 54 to which is connected a thrust bar 55 leading to and connecting with a downwardly projecting ear 56 on the member I; the thrust bar 55 extending on a plane below the tie-rods. This thrust bar may be connected to the end members I and J in any suitable manner, being here shown as affixed thereto by bolts 57 and 58.

In the construction shown in Fig. 3, the end members I and J are integrally connected together by a tie-bar 59 which is cast with the end members as a unit; the tie-bar being recessed on its upper margin adjacent the end members, as indicated at 60 and 61 to receive the side rails 11 and 12 of the trunk rack frame.

It will be observed that the trunk rack here disclosed will, when applied, have a three point attachment to the vehicle, and that the intermediate support D as well as the end supports embodying the brackets E and F with their extension 26, constitute cantilevers projecting from the vehicle. This arrangement affords a substantial mounting for the trunk rack and admits of imposing a considerable load thereon. By mounting the trunk rack structure as herein set forth, a spare tire or wheel may be carried on the structure as well as bumpers with the latter extending outwardly from the tire or wheel and with the tire arranged between the inner ends of the bumpers. The bumpers as here shown are resilient and curve outwardly from points adjacent the ends of the trunk rack structure and terminate in free ends substantially even with the outside edge of the fenders of the automobile.

While the trunk rack mounting as described affords stability to the rack, a tie-rod 62, which ordinarily extends between the brackets E and F may be positioned to connect the extension bars 26, to impart increased rigidity to the structure.

While I have herein illustrated and described my invention specifically in one embodiment thereof, it is obvious that the construction disclosed is subject to being modified to meet varying conditions without departing from the spirit of the invention, and accordingly, the invention comprehends such structures, parts, arrangement, features, and constructions as come within the meaning of the terms and within the scope of the appended claims.

I claim:

1. In combination with an automobile having a pair of rearwardly extending members projecting from the side frame members thereof, a trunk rack structure adapted to be supported intermediate its ends at the rear body portion of the automobile and at its end portions on said rearwardly extending members.

2. In combination with an automobile having rearwardly extending members, a trunk rack structure adapted to be supported by the rear central portion of the automobile and by said rearwardly extending members, and a tire carrier mounted upon said trunk rack structure.

3. In combination with an automobile having rearwardly extending members, a trunk rack structure adapted to be supported by the rear central portion of the automobile and said rearwardly extending members, and resilient bumpers mounted upon said rearwardly extending members.

4. In combination with an automobile having rearwardly extending members, a trunk rack structure adapted to be supported by the rear central portion of the automobile and said rearwardly extending members, a tire carrier mounted upon said trunk rack structure, and resilient bumpers mounted upon said rearwardly extending members adapted to extend outwardly from the tire mounted on said tire carrier.

5. In combination with an automobile having rearwardly extending members, a trunk rack structure adapted to be supported by the rear body portion of the automobile and said rearwardly extending members, a tire carrier mounted upon said trunk rack structure, and resilient bumpers mounted upon said rearwardly extending members adapted to extend outwardly from the tire mounted on said tire carrier, said bumpers curving outwardly from a point adjacent the ends of the trunk rack structure and terminating in free ends substantially even with the outside edge of the fenders of the automobile.

6. In combination with an automobile having rearwardly extending members formed at their extremities with a horizontally curved portion, a rearward extension to the straight portion of said rearwardly extending member, a trunk rack structure adapted to be attached to the rear portion of the body of the automobile to form a major support therefor, resilient bumpers connected at their inner ends of said rearward extensions and supported intermediate of their ends by a resilient member attached to said horizontal curved portion of said rearwardly extending member, and means connecting the rearward end of said rearward extension to the end portions of said trunk rack structure.

7. In combination with an automobile having rearwardly extending members formed at their extremities with a horizontally curved portion, a rearward extension to the straight portion of said rearward extending member, a trunk rack structure adapted to be attached to the rear portion of the body of the automobile to form a major support therefor, resilient bumpers connected at their inner ends to said rearward extensions and supported intermediate of their ends by a resilient member attached to said horizontal curved portion of said rearwardly extending member, and means connecting the rearward end of said rearward extension to the end portions of said trunk rack structure, said bumpers starting at a point adjacent the end of the trunk rack structure and curving rearwardly and outwardly therefrom to a terminating point substantially even with the outer edge of the fenders of the automobile.

8. In combination with an automobile having rearwardly extending members formed at their extremities with a horizontally curved portion, a rearward extension to the straight portion of said rearwardly extending member, a trunk rack structure adapted to be attached to the rear portion of the body of the automobile to form a major support therefor, resilient bumpers connected at their inner ends to said rearward extension and supported intermediate of their ends by a resilient member attached to said horizontal curved portions of said rearwardly extending member, means connecting the rearward end of said rearward extension to the end portions of said trunk rack structure, said bumpers starting at a point adjacent the end of the trunk rack structure and curving rearwardly and outwardly therefrom to a terminating point substantially even with the outer edge of the fenders of the automobile, and a tire carrier mounted upon said trunk rack structure adapted to support a tire between the inner ends of said bumpers.

9. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner side of said end plates and against the inner side of said marginal flange.

10. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner side of said end plates and against the inner side of said marginal flange, said means comprising a lug upon the inner face of said end plates equipped with a screw threaded hole, a shoulder spaced from the inner face of said marginal flange and adapted to force the end of the angle iron bar against the inner face of said marginal flange, a rigid depending bar attached to said angle iron bar and provided with a hole in the depending portion thereof, said depending portion being spaced away from said lug, a screw threaded bolt adapted to pass through the hole in said depending portion and engage the screw threaded hole in said lug.

11. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner sides of said end plates and against the inner side of said marginal flange, and means intermediate the ends of one of said angle iron bars for attaching the trunk rack structure to the lower rear end portion of the body of the automobile.

12. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner sides of said end plates and against the inner side of said marginal flange, means intermediate the ends of one of said angle iron bars for attaching the trunk rack structure to the lower rear end portion of the automobile body, and means intermediate the ends of the opposite angle iron bar of said trunk rack structure for mounting a tire thereon.

13. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner side of said end plates and against the inner side of said marginal flange, means adapted to be attached to one of said angle iron bars for attaching the trunk rack structure to the lower rear end portion of the automobile body, means adapted to be attached to the opposite angle iron bar for mounting a tire thereon, and cooperative means for attaching the last two mentioned means to the trunk rack structure.

14. A trunk rack structure adapted to be mounted on the rear of an automobile comprising vertically disposed end plates having an inwardly extending marginal flange, angle iron bars extending between said end plates, cooperating means upon said bars and said end plates for holding the ends of said bars rigidly against the inner side of said end plates and against the inner side of said marginal flange, means intermediate the ends of one of said angle iron bars for attaching the trunk rack structure to the lower rear end portion of the automobile body, said means consisting of a casting having a face adapted to be attached to the rear body portion of the automobile and a supporting surface adapted to support the intermediate portion of one of said angle iron bars of said trunk rack structure, a tire carrier adapted to be attached to the opposite angle iron bar of said trunk rack structure, and cooperative means for attaching said supporting surface of said casting and said tire carrier to their respective angle iron bars of said trunk rack structure.

15. In combination with an automobile, a pair of brackets extending rearwardly from the automobile frame, extensions on said brackets, a trunk rack extending over said brackets and extensions, means connecting the end portions of said rack to said extensions, and supporting means secured to the automobile projecting beneath said rack intermediate its ends and attached to the latter.

16. In combination with an automobile, a pair of brackets extending rearwardly from the automobile frame, extensions on said brackets, a trunk rack extending over said brackets and extensions, means connecting the end portions of said rack to said extensions, supporting means secured to the automobile projecting beneath said rack intermediate its ends and attached to the latter, and means for supporting a spare tire or wheel carrier to said supporting means.

17. In a trunk rack structure, a trunk rack, means for supporting the ends of the rack on a vehicle frame, and an intermediate support for said rack affixed thereto; said support embodying an end flange for engagement with the vehicle body and frame.

18. In a trunk race structure, a trunk rack, means for supporting the ends of the rack on a vehicle frame, an intermediate support for said rack affixed thereto; said support embodying an end flange for engagement with the vehicle body and frame, and having an outer end formed to receive a spare tire or wheel carrier.

19. In combination with an automobile having a pair of rearwardly extending members projecting from the frame thereof, a trunk rack structure supported intermediate its ends on the rear central portion of the automobile and supported at its end portions on said rearwardly extending members.

20. In combination with an automobile having a body and frame portion and a pair of rearwardly extending members projecting from the frame thereof, a trunk rack structure, means for supporting the end portion of said trunk rack structure on said rearwardly extending members, means projecting from and carried by the rear central portion of the automobile body and frame portion supporting said trunk rack structure intermediate its ends, and means embodied in said last named means for affording a support for a tire carrier.

In testimony whereof, I have affixed my signature.

HARVEY L. JOHNSON.